No. 897,917. PATENTED SEPT. 8, 1908.
H. A. MYERS.
HIGH SPEED ROTARY DEVICE.
APPLICATION FILED MAR. 16, 1907.
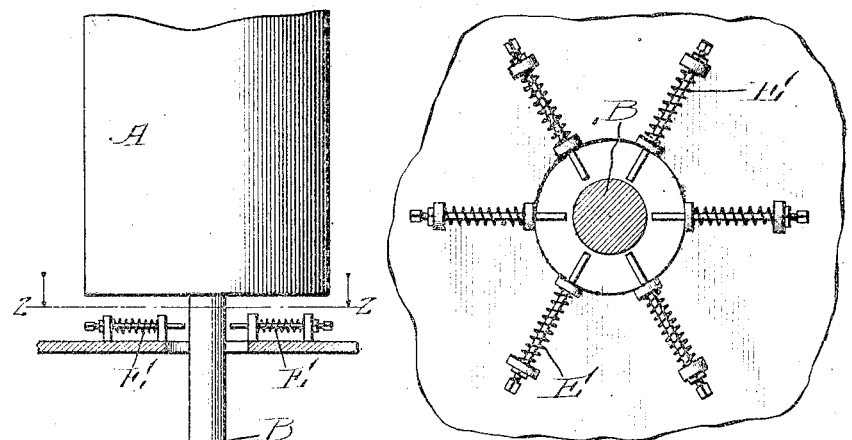
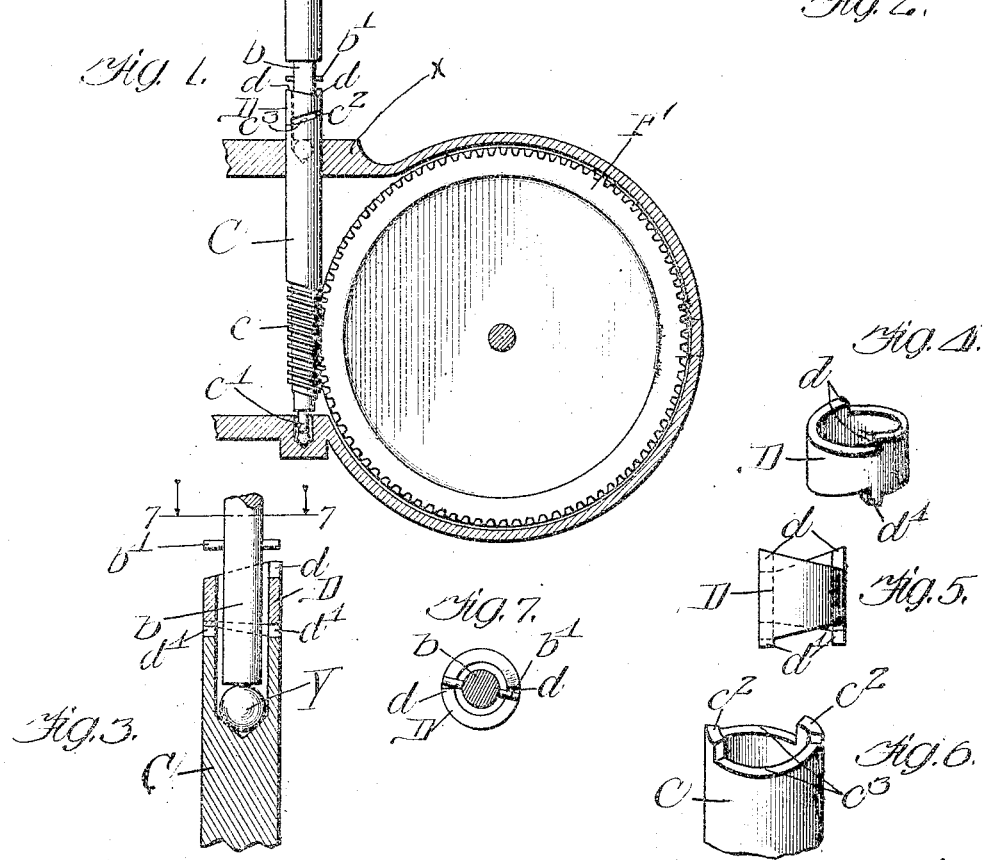
Witnesses:
Inventor:

UNITED STATES PATENT OFFICE.

HUBERT A. MYERS, OF GOSHEN, INDIANA.

HIGH-SPEED ROTARY DEVICE.

No. 897,917.   Specification of Letters Patent.   Patented Sept. 8, 1908.

Application filed March 16, 1907. Serial No. 362,652.

*To all whom it may concern:*

Be it known that I, HUBERT A. MYERS, a citizen of the United States of America, and resident of Goshen, Elkhart county, Indiana, have invented a certain new and useful Improvement in High-Speed Rotary Devices, of which the following is a specification.

My invention relates to cream separators of that character in which a bowl is rotated at high speed to centrifugally separate the cream from the milk, and contemplates an improvement on the self-balancing bowl disclosed in my prior application No. 353,204.

The object of my present invention is to provide an arrangement by which the self-balancing bowl can release itself from the driving mechanism, so that when the gearing and power transmitting connections are stopped the bowl can continue to spin freely, thus improving the general operation of the separator, lessening the labor of the operator, and increasing the general efficiency and serviceability of a machine of this character.

To the foregoing and other useful ends, my invention consists in matters hereinafter set forth and claimed.

In the accompanying drawings Figure 1 shows a self-balancing cream separator bowl, and mechansim for operating the same, embodying the principles of my invention. Fig. 2 is an enlarged cross section on line 2—2 in Fig. 1. Fig. 3 is an enlarged detail vertical section of the connection between the bowl spindle and the power or driven spindle. Figs. 4, 5 and 6 are detail views of the clutch arrangement between the two spindles. Fig. 7 is a cross section on line 7—7 in Fig. 3.

As thus illustrated, the bowl A is provided with a rigid and downwardly extending spindle B, and may contain or be equipped with any suitable separating means or devices. The bowl spindle B is provided with a reduced portion $b$, having a cross pin $b^1$. The power or driven spindle C has a threaded portion or worm $c$, and a reduced lower end portion $c^1$, which latter rests in a suitable step bearing. The upper portion of the spindle C is supported in a suitable bearing X. Preferably, the upper end of the spindle C is made hollow, and provided with a single ball Y, upon which the lower end of the spindle B rests, as shown more clearly in Fig. 3. The said power spindle C has its upper end provided with clutch teeth $c^2$ and a couple of beveled or inclined surfaces $c^3$, as shown more clearly in Fig. 6. The loose or intermediate clutch member D has its upper end provided with ratchet teeth $d$, and its lower end provided with clutch teeth $d^1$. While the mechanism is at rest the teeth $d^1$ rest upon the lowest portions of the beveled or inclined surfaces $c^3$, as shown in Figs. 1 and 3; but when the spindle C is rotated the teeth $d^1$ ride up on the surfaces $c^3$, thus bringing the ratchet teeth $d$ into positive engagement with the pin $b^1$, so as to rotate the spindle B and the bowl above. The worm $c$ is engaged by a worm gearing F, which latter can be rotated by suitable means, as, for example, an ordinary crank handle.

The gearing is preferably so proportioned that the speed of the spindle C is relatively high, so that a quick start of the latter throws the clutch member D upward and into engagement with the pin $b^1$, this causing the bowl to rotate. As soon as the gearing stops, the clutch member D then drops back to its normal position, disengaging the spindle B, and permitting the bowl to rotate freely and without any interference. In this way the gearing can be stopped abruptly and the bowl will be allowed to continue rotating at a high speed, spinning freely upon its lower end, which latter rests upon the ball Y.

In order to steady the bowl in starting, and to support the same at such time in an approximately vertical position, spring devices E are provided and arranged at intervals around the upper portion of the spindle B, in the manner shown in Fig. 2. When the bowl is rotated at full speed, however, the spindle does not engage these spring devices, the bowl being permitted at such time to balance itself on its lower end. With this arrangement any slight inequality in the distribution of the metal or weight of the bowl will not cause a straining and binding of any of the bearings, as the bowl is left free to balance or center itself about its true axis of rotation. At the same time it can spin freely after the gearing is stopped, thus preventing a sudden stopping of the bowl and straining of the gearing, and lessening the labor of the operator. In other words, the benefits of the centrifugal action are obtained for some time after the operator has stopped rotating the spindle C, as explained.

From the foregoing, it will be seen that I provide a spindle and bowl which are free from lateral thrust by the transmission of power thereto. In other words, the power transmission does not subject the spindle of the bowl to side thrust, as the communication of power thereto is balanced. In this way, the spindle is held against endwise movement, but has a lateral play or movement sufficient to enable it to find the true axis of rotation. Such lateral movement is unopposed, and when the clutch automatically disconnects the spindle the bowl is left free to rotate without lateral thrust by either bearings or the transmission of power, and this is done without moving the spindle and bowl up and down, or without shifting the screw or worm endwise. In this way, the clutch is operated by the rotary motion of the power transmitting devices, and the transmission ceases as soon as the worm gearing begins to run a little slower than the bowl. Although the power may continue at a slower speed, still the bowl is free to disengage itself and run ahead of the transmission of power.

While I have embodied my invention in a cream separator, it will be seen that the self-balancing feature can be employed for other kinds of machinery, and that in the following claims I do not limit myself to a machine for this purpose, except where so specified.

What I claim as my invention is:

1. A machine for the purpose specified, having a rotary driven centrifugal member, means for transmitting power to the member to rotate the same about a vertical axis, said member being mounted for lateral movement and balanced against side thrust by the transmission of power thereto, and an automatic clutch adapted to free the member and allow the latter to continue the self-balancing rotation after the transmission of power ceases.

2. A machine for the purpose specified, having a rotary driven centrifugal member, means for communicating power to the member to rotate the same about a vertical axis, said member being mounted for lateral movement and balanced against side thrust by the transmission of power thereto, and automatic means adapted to be operated by the cessation of the transmission of power to free the member and allow the latter to continue the self-balancing rotation.

3. A machine for the purpose specified, having a rotary driven centrifugal member, a worm gearing for rotating the same about a vertical axis, said member being mounted for lateral movement and balanced against side thrust by the transmission of power thereto, and an automatic clutch for freeing the member and allowing the latter to continue the self-balancing rotation after the worm gearing has discontinued the transmission of power, said gearing comprising a worm held against endwise movement.

4. A machine for the purpose specified, having a rotary driven centrifugal member, a transmission gearing for rotating said member about a vertical axis, said member being mounted for lateral movement and balanced against side thrust by the transmission of power thereto, and an automatic connection for freeing the member and allowing the same to run ahead or lead the transmission of power with a self-balancing rotation thereof.

5. A machine for the purpose specified, having a rotary driven centrifugal member, a rotary and downwardly extending spindle, means for supporting said spindle, said spindle being left free to balance itself on the lower end thereof, a power transmission device, and an automatic clutch between the power transmission and the lower end of said spindle, said clutch adapted to disconnect the spindle and permit the latter to rotate freely after the said device has discontinued the transmission of power, said spindle and member being balanced relative to any and all lateral thrust thereon.

6. A machine for the purpose specified, having a rotary driven centrifugal member, upper and lower spindles, a ball in the lower spindle upon which the lower end of the upper spindle rests, and an automatic clutch between said spindles, said clutch adapted to disconnect the upper spindle and allow the same to rotate faster than the lower spindle, said upper spindle being balanced relative to any and all lateral thrust thereon.

7. The improved self-balancing spindle mounted for rotation free from external unbalancing influences, and an automatic disconnecting clutch therefor, substantially as shown and described.

8. A rotary spindle mounted for lateral movement sufficient to enable it to find the true vertical axis of rotation, but held against endwise movement, a suitable gearing for rotating the spindle, and a clutch intermediate the said gearing and spindle, said clutch adapted to be opened by movement of the spindle faster than the gearing.

9. A rotary spindle mounted for lateral movement sufficient to enable it to find the true vertical axis of rotation, means applied to the lower end of the spindle for communicating such a transmission of power thereto that the same is balanced, said power transmission means including mechanism for completely disengaging or freeing the spindle upon rotation of the latter at a speed greater than the speed of the power transmitting means.

10. A rotary spindle free to move laterally to find the true vertical axis of rotation, a power transmitting gearing for rotating the spindle, and a clutch mechanism intermediate the spindle and gearing, said clutch mechanism comprising a loose collar or clutch member, means carried by the said spindle to be engaged by said collar or clutch member, and a rotary member axially alined with the said collar or clutch member and supporting the same, said clutch member being adapted to be thrown into engagement with the spindle by the initial rotation of said rotary member, and to be disengaged therefrom by rotation of the spindle faster than the said rotary member.

Signed by me at Chicago, Illinois, this 6th day of March, 1907.

HUBERT A. MYERS.

Witnesses:
NELLIE CLEGG,
ALBERT JOHN SAUSER.